United States Patent [19]
Beckmann

[11] Patent Number: 5,659,604
[45] Date of Patent: Aug. 19, 1997

[54] SYSTEM AND METHOD FOR TRACING A CALL THROUGH A TELECOMMUNICATIONS NETWORK

[75] Inventor: Alfred G. Beckmann, Colorado Springs, Colo.

[73] Assignee: MCI Communications Corp., Washington, D.C.

[21] Appl. No.: 536,845

[22] Filed: Sep. 29, 1995

[51] Int. Cl.6 .............................. H04M 7/00; H04M 3/22; H04M 15/00; H04M 3/00
[52] U.S. Cl. .............................. 379/220; 379/14; 379/16; 379/34; 379/113; 379/246; 379/249
[58] Field of Search ................................ 379/34, 35, 133, 379/134, 111, 112, 113, 135, 137, 207, 245, 246, 247, 249, 1, 9, 10, 11, 14, 15, 16, 219, 220, 224

[56] References Cited

U.S. PATENT DOCUMENTS 4,464,543  8/1984  Kline et al. .................. 379/247 X Primary Examiner—Krista M. Zele
Assistant Examiner—Harry S. Hong

[57] ABSTRACT

The system and method for tracing a path of a call through a telecommunications network includes at least two switches, a database, a user interface device and a control processor. Each switch has an associated adjunct processor that has a memory that stores call record data. The database stores call routing data for calls traversing each switch. The user interface device accepts selected call parameter data related to a call having a path through the telecommunications network that is to be traced. The control processor accesses the call routing data and the call record data for searching for a call having call parameter data corresponding to the selected call parameter data. The control processor provides report data that is related to the path through the telecommunications network of a call having call parameter data corresponding to the selected call parameter data.

14 Claims, 2 Drawing Sheets

SYSTEM AND METHOD FOR TRACING A CALL THROUGH A TELECOMMUNICATIONS NETWORK

BACKGROUND OF THE INVENTION

1. Field of the Invention

The present invention relates to a system and method for tracing calls through a telecommunications network. More particularly, the present invention relates to a system and method for tracing a path of a call through a telecommunications network that corresponds to selected search parameters.

2. Description of the Related Art

There is a need for the ability for conveniently tracing a path of a call through a telecommunications network so that system diagnostics can be efficiently performed or so that a call reported to have a problem can be quickly troubleshot. Typically, a long distance telecommunications network includes a plurality of switches through which calls traverse. Each switch in the network is connected to every other switch by an intermachine trunk group (IMT). Calls travel through the switches in the network via circuits. A circuit is the physical connection between any two switches.

Usually there is only one IMT between a pair of switches. FIG. 1 shows a single IMT 10 connected between exemplary switch 1 and exemplary switch 2. Each circuit in an IMT is assigned a name at each switch that is based on the name of the switch from which the circuit is viewed. When a call in a switch is routed through a circuit to another switch, the circuit is considered to be made up of a terminating trunk group (TTG) leaving the first switch and an originating trunk group (OTG) arriving at the second switch. As a call traverses a switch, the switch generates a call routing record for the call that includes data related to the originating trunk group, the terminating trunk group, the originating port and the terminating port of the call using circuit naming conventions that are based on the point of view of the switch.

In the situation when a call is routed from switch 1 to switch 2 through circuit 11A in FIG. 1, circuit 11A is named 111 IMT TTG at switch 1, for example, and 222IMT OTG at switch 2, for example. When a call in switch 2 is routed through circuit 11B to switch 1, circuit 11B is properly thought of in the reverse as a terminating trunk group (TTG) leaving switch 2 and an originating trunk group incoming to switch 1. Although circuits 11A and 11B are shown as separate circuits for clarity of call direction, they are intended to be the same physical circuit. In the latter situation, circuit 11B is named 222IMT TTG at switch 2, for example, and 111IMT OTG at switch 1, for example. Since the trunk names 111IMT and 222IMT are different names for the same physical circuit 11 between switches 1 and 2, the respective call routing records stored at switch 1 and switch 2 for calls routed through circuit 11 identify the same circuit, but use different identifying names.

Each switch of the telecommunication network also has an associated adjunct processor (AP) that accumulates call record data used for billing purposes. Periodically, the switch downloads call records to the associated AP which are subsequently accessed by a billing host processor located at a remote location. The call records are divided into call detail records (CDRs), private network records (PNRs), operator service records (OSRs), and private operator service records (POSRs) and include data related to the date/time, the switch site, the call record type, the dialed number, the automatic number identification (ANI) and the pretranslated number of a call. The call records at each respective switch contain information about only the calls traversing that switch.

When a call reported to have a problem requires analysis, it is difficult to trace the path of the call through the telecommunications network because the call routing records storing data relating to each individual leg of the call path must be correlated with the call record data stored at each respective adjunct processor for determining the call path. While the call record data stored by each adjunct processor is readily available from a remote location over a network, for example by the billing host processor, the call routing records are available only at each respective switch or from a separate database. This results in an inconvenient and time consuming task because the call routing records and the call record data are not available together.

SUMMARY OF THE INVENTION

The present invention provides a system for conveniently and efficiently tracing a path of a call through a telecommunications network. According to the present invention, such a system includes at least two switches, a database, a user interface device and a control processor. Each switch has an associated adjunct processor. Each adjunct processor has a memory storing call record data. The database stores call routing information for calls traversing each switch. The user interface device, which preferably provides a graphical user interface, accepts selected call parameter data relating to a call having a path through the telecommunications network that is to be traced. The control processor is coupled to the user interface device, to each of the adjunct processors associated with the switches, and to the database. The control processor receives the call parameter data from the user interface device and accesses the call routing data stored in the database and the call record data stored in the memory of each adjunct processor for searching for a call having call parameter data corresponding to the selected call parameter data for tracing the path of the call. The control processor provides report data to the user interface device that is related to the path through the telecommunications network of a call having call parameter data corresponding to the selected call parameter data.

According to the invention, each adjunct processor has capability for searching the call record data stored in the memory associated with the adjunct processor based on the selected call parameter data. The control processor transfers the selected call parameter data to the adjunct processor and the adjunct processor generates results data related to results of a search of the call record data based on the selected call search parameters. The call routing data stored in the database includes information related to a next switch a call traverses and control processor uses the data related to the next switch a call traverses for searching for the path of the call to be traced. The call record data preferably includes originating trunk group, terminating trunk group, originating port and terminating port data of a call traversing the switch, date/time, switch site, call record type, dialed number, automatic number identification (ANI) data and pretranslated number data.

The present invention also provides a method for tracing a path of a call through a telecommunications network having the steps of receiving the selected call parameter data at the control processor from the user interface device, accessing the call routing data stored in the database, accessing the call record data stored in the memory of each adjunct processor, identifying call routing data and call record data of a call having call parameter data corresponding to the selected call parameter data, and generating report data related to the path through the telecommunications network of the call having call parameter data corresponding to the selected call parameter data. The report data is displayed at the user interface device. Preferably, the step of accessing the call record data includes the steps of transferring the selected call parameter data to the adjunct processor, searching the call record stored in the memory associated with the adjunct processor based on the selected call search parameters, and generating results data at the adjunct processor related to results of a search of the call record data. The next switch a call traverses is identified based on the call routing data.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE PREFERRED EMBODIMENTS

Figure 2:
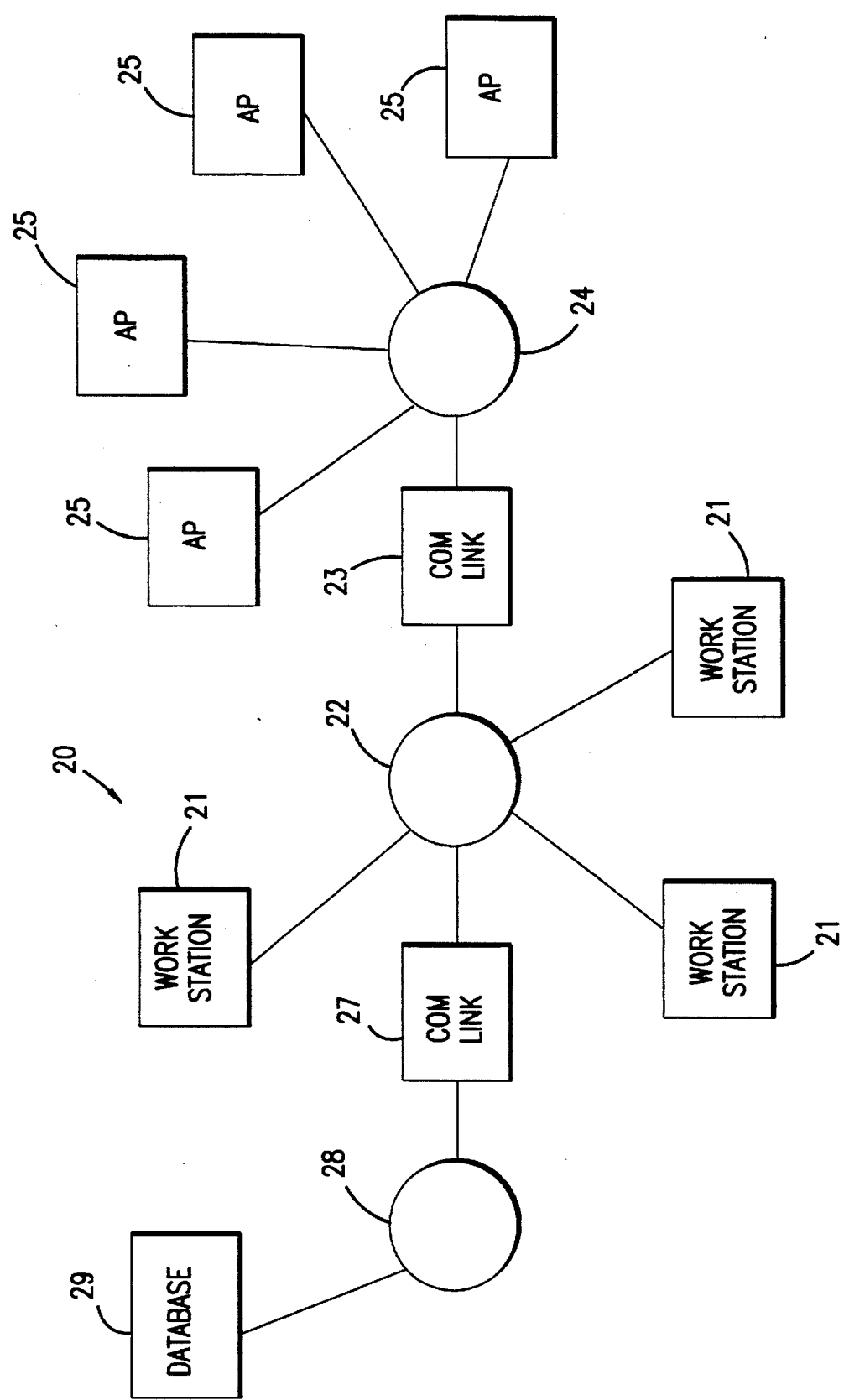
FIG. 2 shows a schematic block diagram of an embodiment of a system for tracing a call through a telecommunication network according to the present invention.

The present invention is directed to a system for tracing a call path through a telecommunications network that corresponds to selected call search parameters for conveniently performing network diagnostics or troubleshooting a call reported to have problems. FIG. 2 shows a schematic block diagram of an embodiment of a call path tracing system 20 according to the present invention.

Figure 1:
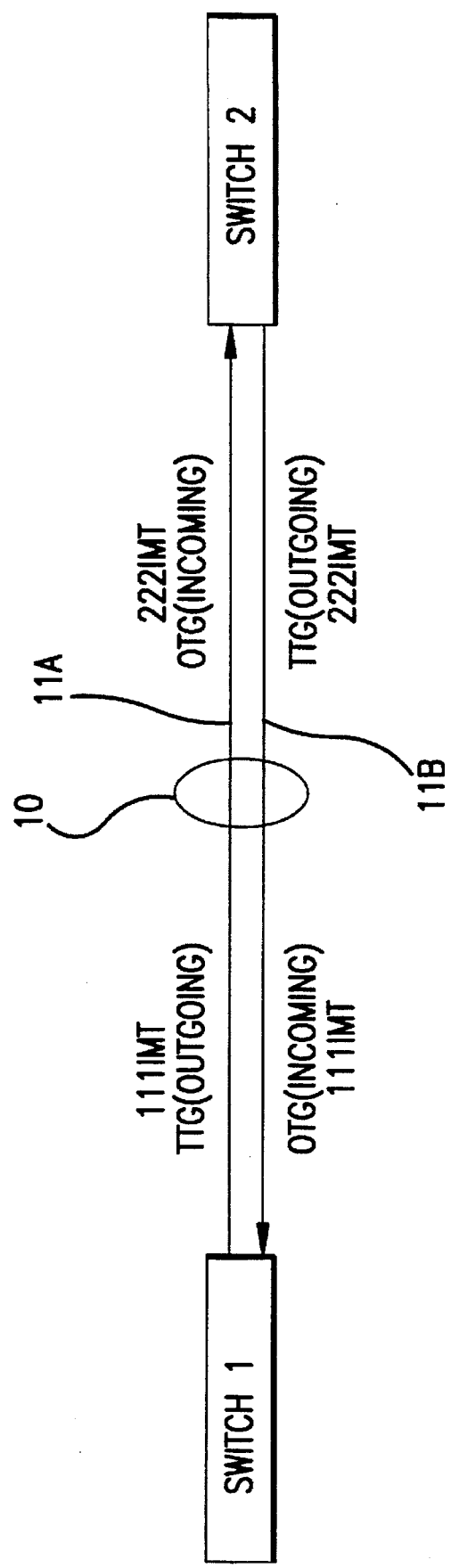
FIG. 1 shows a schematic block diagram showing a single intermachine trunk group connected between two exemplary switches.

System 20 includes a plurality of workstations 21 connected to a local area network (LAN) 22. LAN 22 is connected through a communication link 23 to a first operating system network 24. First operating system network 24 is connected to a plurality of adjunct processors (AP) 25. Each adjunct processor 25 is associated with a switch (FIG. 1). The switch downloads call records that include information related to the date/time, switch site, dialed number, ANI number and pretranslated number of calls traversing the switch for storage by the adjunct processor.

LAN 22 is also connected through a communication link 27 to a second operating system network 28. Second operating system network 28 accesses call routing data that includes information related to originating trunk group and terminating trunk group that is available from a separate database. The call routing data is located in one central database 29 connected to network 28 or distributed throughout the telecommunications system, for example at each respective switch, and available through network 28. As should be appreciated, if the call routing data is available from a central database or a plurality of databases connected to network 24, network 28 is not needed.

To trace a call path through the telecommunications network, a workstation 21 accepts call search parameters through a graphical user interface (GUI). Workstation 21 accesses first operating system network 24 for identifying a call meeting the search parameters at a particular switch that is specified as one of the search parameters. The call search parameters that can be specified for a call search include date/time, switch site, call record type, dialed number, ANI number, pretranslated number, originating trunk group, terminating trunk group, originating port, and terminating port. According to the invention, the search parameters date/time, switch site and call record type are necessary parameters for identifying a particular call.

In the situation when only a dialed number and a call time interval is known about a call that is to have its path traced, the present invention accepts the search parameters without a switch site specified, but with at least the first 6 digits of the 10 digit called number (referred to as a valid NPANXX). The present invention accesses the respective adjunct processors for determining the home switch of the dialed number, that is, the switch site through which all calls to that NPANXX must pass. The search then proceeds with the home switch of the dialed number as the initially specified switch site.

When workstation 21 accesses the adjunct processor attached to the switch specified as one of the search parameters, workstation 21 logs onto the adjunct processor 25 associated with the specified switch. Each adjunct processor 25 has a search function capability that is activated by workstation 21. Workstation 21 transfers the search parameters to the adjunct processor 25 and adjunct processor 25 communicates to workstation 21 the name of the data file that search results will be written to, that is the call record for each call traversing the switch associated with the adjunct processor matching the search parameters. Workstation 21 periodically accesses adjunct processor 25 to check whether the search results data file has been written. When the search results data file has been written, workstation 21 downloads the data file from adjunct processor for further processing at workstation 21.

When a call is identified from the downloaded search results file meeting the search parameters, workstation 21 accesses the call routing information of the switch through the separate database 29 for information related to the next switch destination of the identified call. Once the call routing information is obtained, workstation 21 accesses the adjunct processor associated with the next switch the call traversed as determined by the call routing information. The process of accessing the call routing records is repeated for identifying the next switch traversed by the call.

A call path may be traced from the switch where it enters the telecommunications network to the switch where it leaves the network and vice versa. Call records satisfying the search parameters are collected from each of the adjunct processors associated with the switches that the call traversed and are compiled for display as search results by the graphical user interface at workstation 21. The search parameters can be recalled in list form, and the status of all searches in progress can be displayed. The selected parameters can be edited and resubmitted for conducting a revised call path search. The search results can subsequently be used for generating a work order for correcting hardware and/or software problems experienced by the network.

The call tracing system of the present invention utilizes three processes named, for example, apdsptch.exe, cs.exe and apinter.exe, with apdsptch being the principal process. The processes are extensively threaded and communicate with each other via named pipes. Commands are sent to the apdsptch process from the graphical user interface process cs via a main named pipe. Apdsptch processes the commands and, for those commands requiring access to the adjunct processors, sends the commands to the adjunct processor interface apinter via another named pipe. According to the invention, there is only one apdsptch process running for servicing a distinct set of users and adjunct processor interfaces. If the present invention has a LAN configuration, apdsptch is required to run on a named server for the pipes to work. During initialization, apdsptch reads a configuration file containing various user definable parameters.

The cs process is the user interface process. It contains all of the graphical dialogue boxes for logging onto the system, initiating call searches and displaying parameters and results. Users must first log on to the system before new searches can be submitted. In a LAN configuration, cs may run on any workstation including the named server. The cs process communicates with apdsptch via a named pipe. CS determines whether the apdsptch process is located at a server or is local, as well as the location of a cstrack file based on parameters in a cs configuration file. The cstrack file contains parameters, status, and results of all searches that have not been deleted. If the apdsptch process is not running, cs disables system log in process so that searches may not be initiated, but search parameters, status, and results are available for viewing.

The apinter process performs the adjunct processor interface by communicating with the adjunct processors 25 through communication link 23 (FIG. 2). Commands are sent to apinter via from apdsptch via named pipes.

When the apdsptch process initializes, a named pipe called /pipe/cs/dsp.pip, for example, is created. This named pipe is opened by all other processes during a transaction, that is, when other processes request services from apdsptch. A thread in apdsptch for receiving service requests creates a new temporary pipe when a transaction is received. The name of the temporary pipe is sent through the main pipe to the requesting process so the requesting process can then open the temporary pipe. Once the new temporary pipe connection is established, apdsptch queues the request to another thread for further processing thus freeing the original thread for accepting additional requests through the main pipe. The main pipe connection is then broken for that transaction, and the two tasks conduct the remainder of their transaction through the temporary pipe, which exits for the duration of a single transaction.

The adjunct processor interface process also communicates with apdsptch through a named pipe. When the apinter process initializes, it registers with apdsptch by Sending a transaction through the main pipe. As with any other transaction, apdsptch creates a new pipe for communicating responses, but in this case the two processes do not yet connect. Instead, apdsptch creates a new thread for communicating with apinter. The new thread waits until requests are queued to it, at which time a pipe connection is made and the command is sent to apinter. This thread waits for a response from apinter on the pipe, reads the response, then breaks the connection. The pipe remains intact waiting for additional requests.

According to the invention, all pipes are created and owned by apdsptch because pipes can only connect between processes on a single workstation, or between workstation and a named server. For this reason, when the call tracing system of the present invention is configured as a LAN, apdsptch must run on a named server. Any number of user interfaces and adjunct processor interfaces can communicate through the named server central node.

The only data store for the process of the present invention is the tracking file named cstrack and its associated result data files. The cstrack tracking file contains one record for each request for a call search that is submitted. Each record is an instance of a ApRequestNew class and includes user specified search parameters and selected overhead data. The ApRequestNew class is defined in a header file aputil-.hpp.

When a search is submitted to apdsptch, a record is added to the tracking file cstrack. A status field in the added record indicates the current status of the search. The possible values for the status field are PNDNG, INPRG, POLAP, CMPLT, CNROC, ERROR and RECVR. PNDNG indicates a new search that has not yet been submitted to apinter. INPRG indicates that a search has been submitted to apinter, but has not yet been completed. POLAP indicates that apinter is being queried for results of the present search. CMPLT indicates a completed search with the call records found located in a separate file. CNROC indicates a completed search with no matching records found. ERROR indicates that the particular search parameters have been submitted a predetermined number of times without completion of the search. RECVR indicates that apdsptch executable is in the process of receiving records from apinter.

A results data file is created when apdsptch determines there are call details records to save. A file is generated and saved in the tracking file. Preferably, the results file contains, for example, 100 small header records, followed by up to 100 call records, for example. The call records may be CDRs, PNRs, OSRs or POSRs, depending on the kind of search requested. The tracking and result files are modified only by apdsptch, but may be read by any number of user interface processes from any workstation.

In addition to the tracking and result files, a lock file is created by apdsptch for ensuring that only one apdsptch is running in a directory for informing the user interface process that apdsptch is up and running and for enabling the user interface process to determine if apdsptch has restarted between search requests. Apdsptch creates the lock file at initialization and opens it for read/write access, while denying write access to the lock file for other processes. The lock file is deleted when apdsptch orderly terminates. Apdsptch determines that another instance of itself is already running if the lock file already exists and it cannot be opened for write access which happens, for example, when a previous run has crashed.

The user interface process similarly determines that the apdsptch process is running if the lock file is available for read access, but write access is denied. In addition, the user interface process examines the creation date of the file and time before each transaction is sent to apdsptch. If either time stamp has changed, the user interface concludes that apdsptch has been restarted, and a user is required to again log on to the system.

Data objects are transferred between processes through named pipes. Each transaction consists of an ApTransID object containing 4 data fields followed by zero or more data objects. The first data field of an ApTransID object, TransCode, indicates the type of transaction of the object. An ErrorCode data field indicates a particular error code that has been sent back in response to a request. A Length data field indicates the length of the data object following a transaction object on the pipe. The last data field indicates the Type of the data object that follows the transaction on the pipe.

The transactions available include ApRegisterApi, ApUnRegisterApi, ApLogon, and ApNewSearch. The ApRegisterApi transaction is sent from apinter to apdsptch when apinter informs apdsptch that the apinter process is available. No additional data is sent with this transaction. The ApUnRegisterApi transaction is never sent down a pipe. It is queued internally by apdsptch when apdsptch can no longer communicate with apinter. No additional data is sent.

The ApLogon transaction is sent by the user interface process to apdsptch for requesting a log on to the adjunct processors. The Length data field for this transaction contains the length of an ApLogon object. An ApLogon object containing the log on parameters follows the transaction down the pipe. Apdsptch forwards the ApLogon object to apinter and the ApLogon process follows. Subsequently, apinter sends an ErrorCode to apdsptch indicating any log on error. If the log on process was successful, the transaction object is send down the pipe from apinter to apdsptch followed by an ApLogon object with its switch site list filled in. The ApLogon object is forwarded from apdsptch to cs and the ApLogon process follows.

The ApNewSearch transaction is sent from the user interface process to apdsptch for requesting a new search. The Length field of this transaction contains the length of the ApRequestNew object which follows the ApNewSearch transaction down the pipe. Apdsptch forwards this transaction to apinter when it is received from the user interface. Additionally, apdsptch initiates this transaction when its timer thread determines that a requested search was never successfully submitted to apinter. In either case, an ApRequestNew object follows the transaction down the pipe. ApInter sends the transaction to apdsptch with the Length field containing the length of an ApRequestNew object that follows the transaction down the pipe. The transaction object is forwarded from apdsptch to the user interface if the request was initiated by the user interface. The Length field is always zero and the ErrorCode field indicates any error. No ApRequestNew object is sent back to the user interface, If the request was initiated from apdsptch, no transaction is forwarded to the user interface.

The default configuration file for apinter is apinter.cfg and identifies the communication port and parameters used when communicating with the adjunct processors 25. Apinter.cfg also indicates the name of the server, if any, to ap-inter on which apdsptch will run. The parameters of apinter.cfg and their acceptable values are:

| | |
|---|---|
| COMPORT | The number of the asynchronous communications port. Default value is 1. |
| BAUDRATE | Baud rate (30, 1200, 2400, 4800, 9600). Default setting is 4800. |
| DATA | The number of data bits (7 or 8). Default value is 8. |
| STOP | The number of stop bits (0=1 stop bit, 1=1.5 bits, 2=2 bits). Default setting is 0 (1 stop bit). |
| PARITY | Type of parity (None, odd, even, mark, space). Default setting is none. |
| SERVER | The name of the server on which apdsptch is running. If this is a non-network configuration of the present invention, then all programs run on a single workstation and this parameter is omitted. |

The default configuration file for the user interface process is callsrch.cfg and includes the following parameters:

| | |
|---|---|
| LPATH | The path to the directory containing the cstrack and callsrch.loc files. If LPATH is not specified, cs will look for these files in the current working directory. |
| SERVER | The name of the server on which apdsptch is running. This parameter is omitted in a single workstation environment where all programs run on the single workstation. |

The default configuration file for apdsptch is apdsptch.cfg and includes the following parameters:

| | |
|---|---|
| RANGEn POLLINTERVALn | These parameters, specified in pairs, determine the frequency with which the first operating system network is automatically polled for the results of an individual call search. Searches less than RANGE1 seconds old are polled every POLLINTERVAL1 seconds; those less than RANGE2 seconds old are polled every POLLINTERVAL2 seconds; all other searches are polled every POLLINTERVAL3 seconds. |
| EXPIREDAYS | The number of days after which searches will be automatically deleted from the tracking file (cstrack). Deleted results cannot be retrieved. |

While the present invention has been described in connection with the illustrated embodiments, it will be appreciated and understood that modifications may be made without departing from the true spirit and scope of the invention.

What is claimed is:

1. A system for tracing a path of a call through a telecommunications network, the system comprising:

a switch;

an adjunct processor, connected to said switch, having a memory that stores switch call record data for calls traversing said switch and a search function;

a database that stores call routing data for the telecommunications network, said call routing data including trunk group data;

a parameter input means for inputting call parameter data relating to the path of the call to be traced through the telecommunications network; and a control processor coupled to said parameter input means, said adjunct processor and said database, including, means for activating said search function in said adjunct processor to identify a call record corresponding to said call parameter data, wherein said search function searches in said adjunct processor based on said call parameter data, means for accessing said call routing data stored in said database to obtain a next switch destination for the call, wherein a next switch at said next switch destination is connected to a next adjunct processor, and means for reporting said call record and said next switch destination.

2. The system according to claim 1, wherein said control processor relies on said next switch to continue tracing the call.

3. The system according to claim 2, wherein said parameter input means includes a graphical user interface for accepting said call parameter data.

4. The system according to claim 1, wherein said trunk group data includes originating trunk group, terminating trunk group, originating port and terminating port data, date/time, switch site, call record type, dialed number, automatic number identification data and pretranslated number data for each switch in the telecommunications network.

5. The system according to claim 1, wherein said control processor includes means for identifying said switch based on said call parameter data.

6. The system according to claim 1, wherein said control processor accesses said next switch adjunct processor connected to said switch at said next switch destination.

7. The system according to claim 1, wherein said switch call record data includes only data relating to said switch.

8. The system according to claim 1, wherein said control processor includes means for identifying a home switch.

9. A method for tracing a path of a call through a telecommunications network, the system comprising a switch, an adjunct processor connected to the switch having a memory that stores switch call record data for calls traversing the switch and a search function, a database that stores call routing data for the telecommunications network, the call routing data including trunk group data, a parameter input means for inputting call parameter data relating to the path of the call to be traced through the telecommunications network, and a control processor coupled to the parameter input means, the adjunct processor and the database, the control processor including means for activating the search function in the adjunct processor, means for accessing the call routing data stored in the database to obtain a next switch destination for the call, the method comprising the steps of:

(1) inputting the call parameter data into the control processor;

(2) searching the switch call record data in the adjunct processor utilizing the search function and the call parameter data;

(3) searching the call routing data in the database to determine a next switch destination;

(4) searching a next switch call record data stored in a next switch adjunct processor connected to a next switch at the next switch destination; and (5) searching the call routing data in the database and call record data for each remaining switch in the call.

10. The method according to claim 9, further comprising the step of:

generating report data related to the path through the telecommunications network.

11. The method according to claim 10, further comprising the step of:

displaying the report data at the parameter input means, wherein the parameter input means comprises a user interface device.

12. The method according to claim 9, further comprising the steps of:

transferring the call parameter data to the adjunct processor from the control processor; and generating search results data at the adjunct processor.

13. A method for tracing a path of a call through a telecommunications network, comprising the steps of:

(1) specifying call parameter data for the path of the call;

(2) identifying a switch to be accessed based on the call parameter data;

(3) searching call record data stored in an adjunct processor connected to the switch to identify a switch call record corresponding to the call parameter data, wherein the call record data stored in the adjunct processor includes data for calls traversing the switch;

(4) searching call routing data stored in a database based on the switch call record to determine a next switch through which the call passes, wherein the call routing data includes trunk group data;

(5) searching call record data stored in a next switch adjunct processor connected to the next switch to identify a next switch call record, wherein the call record data stored in the next switch adjunct processor includes data for calls traversing the next switch.

14. A method according to claim 13, comprising the steps of:

searching the call routing data in the database and call record data for each remaining switch in the call.

* * * * *